United States Patent
Engel

(10) Patent No.: US 6,948,846 B2
(45) Date of Patent: *Sep. 27, 2005

(54) TEST APPARATUS FOR POWER CIRCUITS OF AN ELECTRICAL DISTRIBUTION DEVICE

(75) Inventor: Joseph C. Engel, Monroeville, PA (US)

(73) Assignee: Eaton Corporation, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/691,737

(22) Filed: Oct. 23, 2003

(65) Prior Publication Data

US 2005/0089079 A1 Apr. 28, 2005

(51) Int. Cl.[7] .................................. G01K 1/00
(52) U.S. Cl. .................... 374/141; 374/208; 361/42
(58) Field of Search ........................... 374/141, 142, 374/208, 1, 100; 702/99, 118, 57, 60, 130; 324/500, 555, 760; 340/500, 501; 361/42, 600–602, 641

(56) References Cited

U.S. PATENT DOCUMENTS

| | | | |
|---|---|---|---|
| 3,878,435 A | | 4/1975 | Van Zeeland et al. |
| 3,922,600 A | * | 11/1975 | Roveti ........................ 324/508 |
| 3,967,195 A | * | 6/1976 | Averitt et al. ................ 324/508 |
| 4,081,852 A | | 3/1978 | Coley et al. |
| 4,210,024 A | * | 7/1980 | Ishiwatari et al. ........... 374/183 |
| 4,470,711 A | * | 9/1984 | Brzozowski ................. 374/179 |
| 4,907,118 A | * | 3/1990 | Hames .......................... 361/56 |
| 5,260,676 A | | 11/1993 | Patel et al. |
| 5,293,522 A | | 3/1994 | Fello et al. |
| 5,341,191 A | | 8/1994 | Crookston et al. |
| 5,469,051 A | * | 11/1995 | Yarmchuk ................. 324/158.1 |
| 5,889,643 A | | 3/1999 | Elms |
| 6,064,313 A | * | 5/2000 | Anderson .................... 340/660 |
| 6,068,400 A | * | 5/2000 | Nelson et al. ............... 374/179 |
| 6,218,844 B1 | * | 4/2001 | Wong et al. ................. 324/509 |
| 6,225,907 B1 | * | 5/2001 | Derryberry et al. ......... 340/584 |
| 6,293,700 B1 | * | 9/2001 | Lund et al. .................. 374/181 |
| 6,477,021 B1 | | 11/2002 | Haun et al. |
| 6,707,652 B2 | * | 3/2004 | Engel ........................... 361/42 |
| 6,721,672 B2 | * | 4/2004 | Spitaels et al. ................ 702/62 |
| 6,724,589 B1 | * | 4/2004 | Funderburk ................... 361/42 |
| 6,734,680 B1 | * | 5/2004 | Conard ........................ 324/509 |
| 6,806,718 B2 | * | 10/2004 | Berkely ....................... 324/500 |
| 6,829,124 B2 | * | 12/2004 | Leopold et al. ............... 361/42 |
| 6,831,554 B2 | * | 12/2004 | Takehara .................... 340/501 |
| 2001/0029433 A1 | | 10/2001 | Scott |
| 2004/0001526 A1 | * | 1/2004 | Hoffer et al. ................ 374/141 |
| 2005/0071093 A1 | * | 3/2005 | Stefan .......................... 702/60 |
| 2005/0073780 A1 | * | 4/2005 | Elms et al. ................... 361/42 |

OTHER PUBLICATIONS

Sletbak, J. et al., "Glowing Contact Areas in Loose Copper Wire Connections", IEEE, 1991, pp. 244–248.

Hagimoto, Yasuaki, "Japanese Reports on Electrical Fire Causes", http://members.ozemail.com.au/–tcforen/japan/index.html, 1996, 12 pp.

* cited by examiner

Primary Examiner—Gail Verbitsky
(74) Attorney, Agent, or Firm—Martin J. Moran

(57) ABSTRACT

A glowing contact or high resistance test device includes a housing and first and second circuits substantially within the housing. The first and second circuits include first and second electrical plugs disposed from the housing and adapted to electrically engage and thermally communicate with line and neutral circuits, respectively, of an electrical receptacle. First and second diode temperature sensors are proximate the first and second circuits and the first and second electrical plugs, respectively. The first and second sensors output first and second signals representative of the first and second temperatures of the line and neutral circuits, respectively. An amplifier circuit determines a difference between the first and second signals. A window comparator circuit includes a light emitting diode, which displays an indication signal when the absolute value of the difference exceeds a predetermined value.

25 Claims, 4 Drawing Sheets

TEST APPARATUS FOR POWER CIRCUITS OF AN ELECTRICAL DISTRIBUTION DEVICE

CROSS-REFERENCE TO RELATED APPLICATION

This application is related to commonly assigned, concurrently filed U.S. patent application Ser. No. 10/192,580, filed Jul. 10, 2002, entitled: "Electrical Switching Apparatus Including Glowing Contact Protection".

BACKGROUND OF THE INVENTION

1. Field of the Invention

The invention relates to testing of electrical systems and, more particularly, to apparatus for testing of electrical distribution devices, such as, for example, a receptacle outlet or a wiring device.

2. Background Information

A glowing contact is a high resistance connection, which can form at the interface of a copper wire and a screw terminal, for example, of a receptacle. The resulting temperature rise at this connection point can melt the wire's insulation and damage the receptacle. It is desirable to be able to detect this condition and interrupt the current before the glowing contact fault progresses to a hazardous condition.

The hazard associated with aluminum wiring has been known and understood for thirty years. The connection of an aluminum wire conductor to the terminal of a wiring device is unstable, since the aluminum, over time, tends to flow, thus, making the aluminum wire-to-terminal a high resistance connection. The resulting $I^2R$ heating causes local heating that can melt the wire's insulation and the receptacle. It was believed that simply returning to copper wire would resolve this problem. Unfortunately, this is not true. Furthermore, most people, outside of the standards and wiring device industry, are unaware of the glowing contact problem. Also, the lack of wide spread public knowledge of the glowing contact problem may follow from the fact that there has been no known solution to this problem.

It is very easy to create a high resistance or glowing contact at a receptacle terminal using copper wire. See, for example, Sletbak, J., et al., "Glowing Contact Areas in Loose Copper Wire Connections," IEEE, 1991, pp. 244–48.

The hazards associated with glowing contacts, including contacts made with all combinations of copper, brass and iron are known. See Yasuaki Hagimoto, "Japanese Reports on Electrical Fire Causes," 1996, 12 pp.

In a similar manner that aluminum oxide creates the aluminum wire problem, the culprit associated with a glowing contact is copper oxide. There are two recognized mechanisms for creating a high resistance copper oxide contact: arcing; and fretting. The arcing mechanism involves, for example, a loose receptacle screw terminal and slight movement of the wire while it is carrying a current. Every time the electrical connection is broken, a single electrical arc discharge can occur. Fretting involves wire-screw connection motion without breaking the connection.

FIG. 1 shows the voltage across the terminal-to-wire connection in the upper trace (about 170 V peak) and the current through that connection in the lower trace (about 15 A peak) for different intervals of an electrical connection being broken while carrying current. This pair of voltage and current traces is broken into three intervals I,II,III. The first interval I shows normal operation in which there is negligible voltage across the terminal-to-wire connection, which has a relatively low resistance, with an alternating current flowing through that connection. During the second interval II, there is a significant terminal to wire-screw connection voltage due to a single arcing (negative) half cycle event. Hence, there is a corresponding reduction in the magnitude of the alternating current flowing through that connection. Finally, during the third interval III, the terminal-to-wire connection becomes an open circuit and the voltage across the terminal-to-wire connection is the line voltage. As a result of the open circuit, there is essentially no current flowing through that connection.

While there is essentially very little power dissipated in the terminal-to-wire connection during the first and third intervals I,III, relatively significant arcing and power dissipation occurs in the second interval II. To the extent that the second interval II may become relatively periodic or persistent, then oxidation can occur at the copper wire-screw interface where the half cycle arcing has occurred with each breaking of the wire-screw connection. This copper oxide layer at the wire-screw interface can also occur due to the mechanism of fretting or a rubbing action with no arcing.

By Paschen's laws, it is not possible to create a sustained copper-to-copper through air arc discharge in a 120 $V_{RMS}$ circuit with a resistive load. An arc is formed when the contact breaks, although it extinguishes at the first zero current crossing, since the voltage is too small for a "re-strike". This is sometimes called a "spark" rather than an "arc". There can be a spark whenever an electrical contact is broken due to local heating at the break point. Hence, an inductive load is needed for sustained cycle-to-cycle arcing in most 120 $V_{RMS}$ residential wiring, other than a 240 $V_{RMS}$ circuit. Otherwise, with a resistive load, a peak voltage of about 300 volts is needed in order to create a sustained arcing event as compared to an available peak value of about 170 volts for a 120 $V_{RMS}$ circuit.

Each single arc discharge forms a small amount of copper oxide ($Cu_2O$) at the terminal-to-copper wire interface. With repeated discharges, the amount of the copper oxide increases over time. Copper oxide has a number of characteristics which, when combined, creates a hazard. First, the interface can be mechanically strong. Hence, once the terminal-to-copper wire connection is made through the copper oxide, the connection may become permanent. Second, copper oxide is a semiconductor that has a very high negative resistance-versus-temperature characteristic between about 180° C. and about 250° C. Over this temperature range, the resistance decreases as much as five orders of magnitude. As the connection heats, the current tends to concentrate into a relatively narrow region, thereby resulting in a very high current density and temperature. For example, a spot temperature of about ~1200° C. may result. The wire and screw temperatures near the connection point can exceed 300° C., which temperature is hot enough to melt, for example, the wire's insulation and the receptacle's plastic housing, but not the copper oxide.

During a glowing contact fault in a receptacle, the copper wire reaches a glowing temperature value at which time the wire looks like an electric heater coil. First, the wire's insulation melts at the terminal and, then, slowly progresses away from the terminal toward other wires in the receptacle's outlet box. This can result in either an arcing fault or a ground fault if the bare glowing wire contacts another conductor. Second, the heat resulting from the glowing contact fault flows into the receptacle and causes the plastic housing of the receptacle to melt. As the plastic melts, the receptacle loses its mechanical integrity and, thus, the electrical isolation between conductors is compromised. This may ultimately lead to either a line-to-ground fault or a neutral-to-ground fault. In the event that the upstream protective device (e.g., a circuit breaker) does not respond, then the plastic could ignite.

FIG. 2 shows a receptacle with a flowing contact at the line terminal T resulting in the insulation melting away from the line conductor C in the area of that line terminal.

Once a glowing contact is formed, the current during the formation of the glowing contact and the subsequent current flowing through the glowing contact is typically normal, since the voltage drop across a glowing contact is typically about 2 VAC as shown in FIG. 3. The existence of a glowing contact, therefore, is not reliably detectable by a conventional upstream current protective device (e.g., a conventional circuit breaker or fuse). However, significant damage may result to both the wire's insulation and the receptacle. On the other hand, if an upstream circuit breaker with both arc and ground fault protection is employed, then that circuit breaker will respond to arcing or a ground fault resulting from insulation damage caused by a glowing contact and will eventually trip in order to de-energize the branch circuit, thereby protecting the damaged wire and/or receptacle.

High resistance connections, such as cause glowing contacts, are most typically "behind the wall" and, thus, are hidden. Hence, there is the need for the detection of such hidden problems. Accordingly, there is room for improvement in apparatus for testing electrical distribution devices, such as receptacle outlets and wiring devices.

SUMMARY OF THE INVENTION

These needs and others are met by the present invention, in which a test device employs dual temperature sensors, which output signals representative of the temperatures of two power circuits of an electrical distribution circuit, such as, for example, a receptacle outlet or a wiring device. In turn, a detection circuit determines the difference between those two temperature representative signals and provides an indication signal as a function of that difference.

The differential temperature circuitry may be housed by a tester, such as a portable or hand-held device, including a male connection, which allows it to be plugged into a receptacle outlet. The tester may include a female connection, which is opposite the male connection, in order to allow an electrical load, such as a heater, to be plugged into the tester, with a direct electrical connection being provided between the male and female connections.

As one aspect of the invention, a test apparatus for a first power circuit and a second power circuit of an electrical distribution device comprises: a first circuit adapted to thermally respond to a first temperature of the first power circuit of the electrical distribution device; a second circuit adapted to thermally respond to a second temperature of the second power circuit of the electrical distribution device; a first temperature sensor proximate the first circuit and outputting a first signal representative of the first temperature of the first power circuit; a second temperature sensor proximate the second circuit and outputting a second signal representative of the second temperature of the second power circuit; a third circuit determining a difference between the first and second signals; and a fourth circuit outputting an indication signal as a function of the difference.

The first circuit may include a line connection, which is adapted to electrically engage and thermally communicate with the first power circuit of the electrical distribution device. The line connection may be a male plug which is adapted to electrically engage a female socket.

The second circuit may include a neutral connection, which is adapted to electrically engage and thermally communicate with the second power circuit of the electrical distribution device. The neutral connection may be a male plug which is adapted to electrically engage a female socket.

The fourth circuit may comprise a comparator, which outputs the indication signal when the difference exceeds a predetermined value.

The fourth circuit may comprise a window comparator having a first reference, a second reference, an input inputting the difference, and an output having the indication signal, the indication signal being active when the difference is greater than the first reference or less than the second reference.

As another aspect of the invention, a test device for a first power circuit and a second power circuit of an electrical distribution device comprises: a housing; a first circuit substantially within the housing, the first circuit including a first electrical connection disposed from the housing and adapted to electrically engage and thermally communicate with the first power circuit of the electrical distribution device; a second circuit substantially within the housing, the second circuit including a second electrical connection disposed from the housing and adapted to electrically engage and thermally communicate with the second power circuit of the electrical distribution device; a first temperature sensor proximate the first circuit and the first electrical connection, the first temperature sensor outputting a first signal representative of the first temperature of the first power circuit; a second temperature sensor proximate the second circuit and the second electrical connection, the second temperature sensor outputting a second signal representative of the second temperature of the second power circuit; a third circuit determining a difference between the first and second signals; and a fourth circuit displaying an indication signal as a function of the difference.

The electrical distribution device may be a receptacle including a line socket for the first power circuit and a neutral socket for the second power circuit. The first electrical connection may be a first line plug adapted to electrically engage and thermally communicate with the line socket. The second electrical connection may be a second neutral plug adapted to electrically engage and thermally communicate with the neutral socket.

The housing may include a three-terminal plug disposed therefrom, with the three-terminal plug including the first line plug, the second neutral plug and a third ground plug, which is electrically connected to the housing.

The housing may further include a three-terminal socket disposed therefrom, with the three-terminal socket including a first line socket electrically connected to the first line plug, a second neutral socket electrically connected to the second neutral plug, and a third ground socket electrically connected to the third ground plug.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
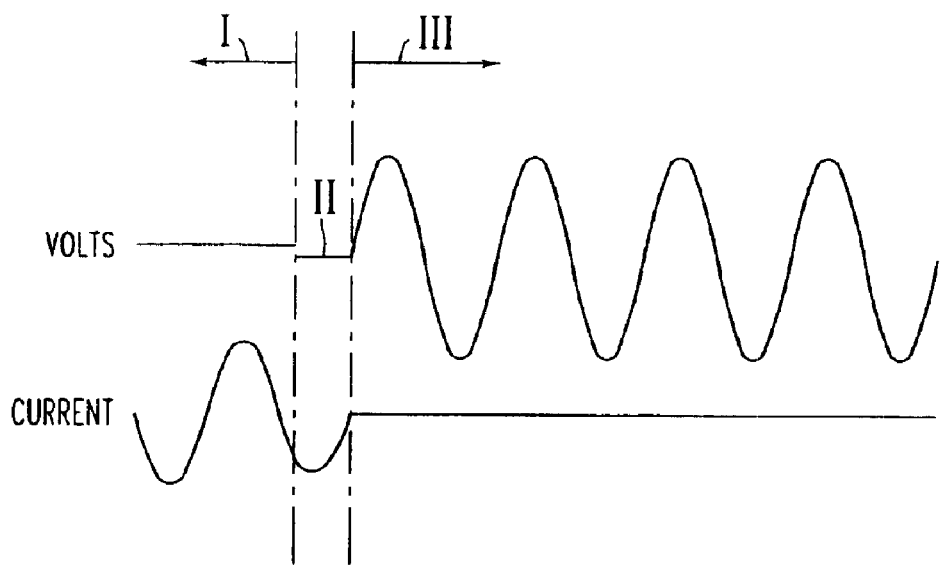
FIG. 1 is a plot of voltage and current versus time across a terminal-to-wire connection being broken while carrying current.
Figure 4:
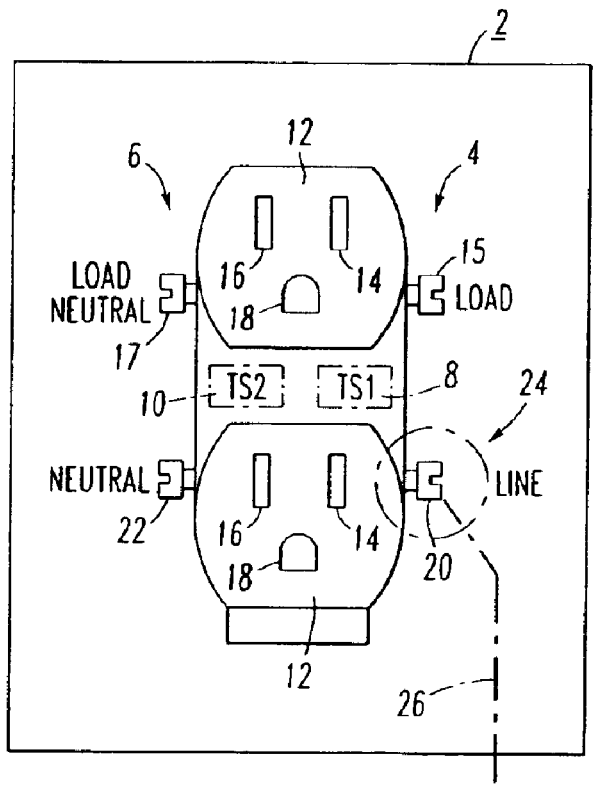
FIG. 4 is a front elevation view of a receptacle having a glowing contact.
Figure 2:
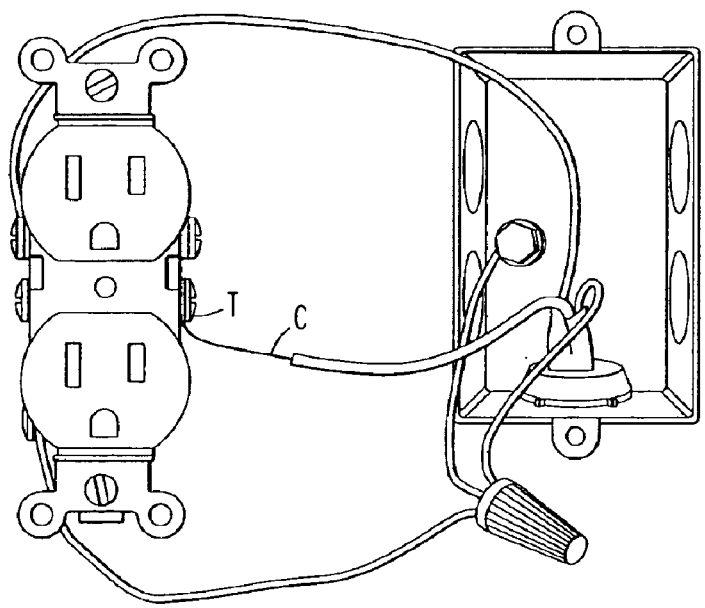
FIG. 2 is a front elevation view of a receptacle and an outlet box during a glowing contact condition on the line terminal.
Figure 5:
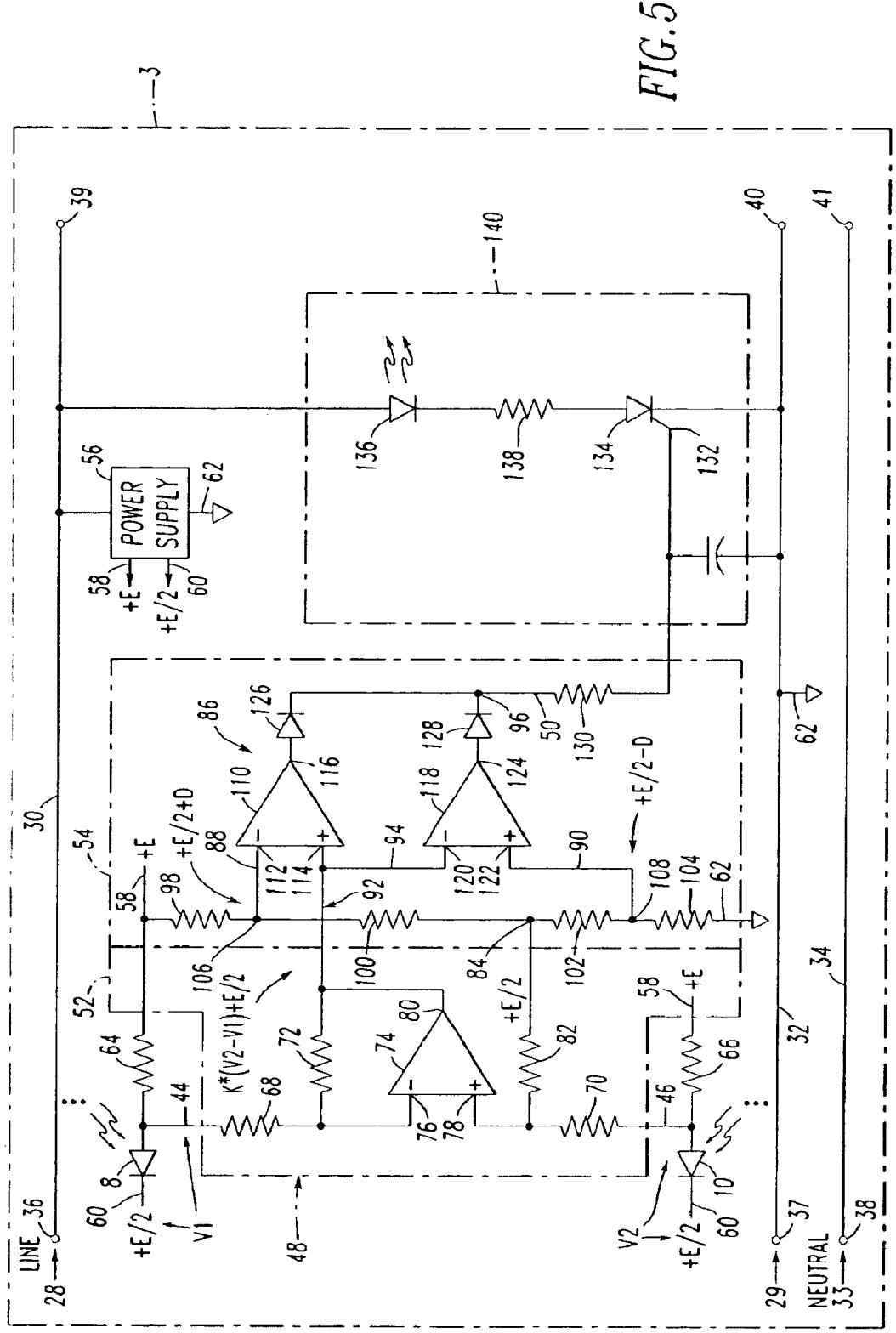
FIG. 5 is a block diagram in schematic form of a tester in accordance with the present invention.

Referring to FIGS. 4 and 5, an electrical distribution device, such as a receptacle 2, and a tester 3 for that device are respectively shown. The receptacle 2 includes a line circuit 4 having a first temperature and a neutral circuit 6 having a second temperature. In accordance with the present invention, the tester 3 includes a first temperature sensor (TS1) 8, which senses the first temperature of the line circuit 4, and a second temperature sensor (TS2) 10, which senses the second temperature of the neutral circuit 6. Although the disclosed receptacle 2 is a conventional ground fault circuit interrupter (GFCI), any conventional electrical distribution device, such as a conventional receptacle outlet (not shown) having line and neutral, or line, neutral and ground connections, may be employed.

As is conventional, the receptacle 2 includes one or more three-conductor outlets 12 having female load, load neutral and ground terminals 14, 16, and 18, respectively. The receptacle 2 has separable contacts (not shown) to allow breaking the line circuit 4 and possibly the neutral circuit 6. In order to allow downstream or feed-through ground fault protection, separate screw terminals 15,17, which are directly electrically connected to the respective female terminals 14,16, are provided. The receptacle 2 also includes line and neutral screw terminals 20 and 22, respectively, for electrical connection to a suitable power line (e.g., 120 $V_{RMS}$) and load and load neutral screw terminals 15 and 17, respectively, for electrical connection to the load. Alternatively, or in addition to the screw terminals 15,17, 20,22, any suitable terminal (e.g., without limitation, compression terminals) may be employed. Typically, one or more screw terminals (not shown) are provided for electrical connection to a suitable ground for the female ground terminals 18.

Figure 3:
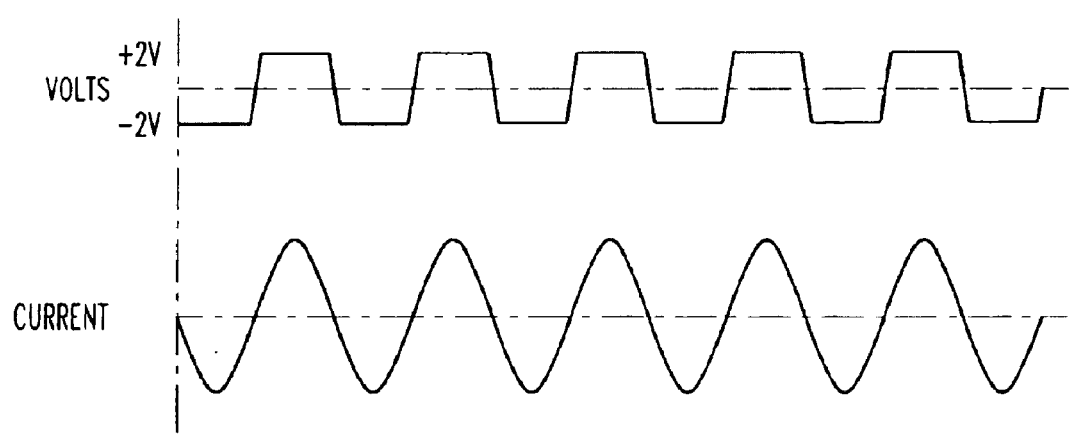
FIG. 3 is a plot of voltage and current versus time across a terminal-to-wire connection during a glowing contact condition.

FIG. 4 shows a glowing contact 24 at the line terminal 20 of the receptacle 2 and a conventional copper conductor 26 (shown in phantom line drawing) for electrical connection to the power line (not shown). In this example, the metal components (not shown) in thermal contact with the line circuit 4, such as line terminal 20 and load terminal 15, run relatively very hot, and much hotter than the corresponding metal components (not shown) in the neutral circuit 6. This is the result of the glowing contact having, for example, a power dissipation of about 20 watts (2V times 10 A) as shown in FIG. 3. It will be appreciated, however, that a glowing contact (not shown) may occur on the load terminal 15 or on the neutral terminals 17 or 22 of the receptacle 2. Hence, the metal components (not shown) in thermal contact with the neutral terminals 17 or 22 may run relatively very hot, and much hotter than the corresponding metal components (not shown) in the line circuit 4. In this example, with the glowing contact 24 at the line terminal 20, the line components are at a relatively higher temperature than the temperature of the other neutral components. If a glowing contact (not shown) is at the load terminal 15 or at the neutral terminal 17, then, when the separable contacts (not shown) are closed, the temperature of all metal components of the line circuit 4 or the neutral circuit 6, respectively, are essentially the same.

Referring to FIG. 5, the circuitry of the tester 3 is shown. The tester 3 includes a line circuit 28 (e.g., a conductor) and a neutral circuit 29 (e.g., a conductor) which provide a line current path 30 and a neutral current path 32, respectively. The circuits 28 and 29 are adapted to thermally respond to the first and second temperatures of the line and neutral circuits 4 and 6, respectively, of the receptacle 2 of FIG. 4. The tester 3 preferably also includes a ground circuit 33 (e.g., a conductor), which provides a ground path 34. Preferably, the circuits 28, 29 and 33 have suitable input connections, such as a line connection (e.g., a male plug) 36, a neutral connection (e.g., a male plug) 37 and a ground connection (e.g., a male plug) 38, respectively. The line connection 36 of the line circuit 28 is adapted to electrically engage and thermally communicate with the socket 14 of the line circuit 4 of the receptacle 2. Similarly, the neutral connection 37 of the neutral circuit 29 is adapted to electrically engage and thermally communicate with the socket 16 of the neutral circuit 6 of the receptacle 2. Although not required, the circuits 28, 29 and 33 may have, as shown in FIG. 5, suitable output connections, such as a load connection (e.g., a female socket) 39, a load neutral connection (e.g., a female socket) 40 and a ground connection (e.g., a female socket) 41, respectively.

In accordance with the present invention, the first temperature sensor (TS1) 8 outputs a first signal 44 representative of the common first temperature of the line circuits 4 and 28, the second temperature sensor (TS2) 10 outputs a second signal 46 representative of the common second temperature of the neutral circuits 6 and 29, and a circuit 48 provides a glowing contact indication signal 50 as a function of a difference between the first temperature and the second temperature. The circuit 48 includes a first circuit 52, which determines a difference between the first and second signals 44,46, and a second circuit 54, which provides the glowing contact indication signal 50 as a function of that difference.

In the exemplary embodiment, a suitable power supply 56 is powered from the line and neutral circuits 28,29. The power supply 56 has two reference voltage outputs 58,60 with respect to a common reference output 62, which is electrically connected to the neutral circuit 29. The voltage (+E VDC) of the first reference voltage output 58 is preferably twice the voltage (+E/2 VDC) of the second reference voltage output 60, although any suitable reference voltage values may be employed. The first temperature sensor (TS1) 8 is a diode, which is disposed proximate the line circuit 28 (e.g., proximate line connection 36), and the second temperature sensor (TS2) 10 is a diode, which is disposed proximate the neutral circuit 29 (e.g., proximate neutral connection 37). First and second resistors 64,66 electrically connect the anodes of the diodes 8,10 to the first reference voltage output 58. The cathodes of the two diodes 8,10 are electrically connected to the second reference voltage output 60. The first and second diodes 8,10 have respective forward voltages V1,V2 and have a temperature coefficient of about −2 mV/° C.

If the line connection (e.g., male plug) 36 of the line circuit 28 is electrically connected to and, thus, in thermal communication with, the female load terminal 14 of one of the three-conductor outlets 12 of FIG. 4, then the glowing contact 24 of FIG. 4 raises the temperature of the line circuit 4 of FIG. 4 and, also, the line circuit 28 of FIG. 5. Hence, the upper (with respect to FIG. 5) diode 8 runs hotter than the lower diode 10, since the upper diode 8 is physically closer to the relatively hotter line circuit 28. For example, the voltage drop across a silicon diode, when biased at a constant current (e.g., such as diodes 8,10 as energized through respective resistors 64,66 from the voltage +E VDC), decreases at about 2 mV/° C. As a further example, a 30° C. diode temperature difference translates into an approximate 60 mV difference in voltage (i.e., V2−V1), wherein V1 is the voltage drop across the upper diode 8 and V2 is the voltage drop across the lower (with respect to FIG. 5) diode 10.

The circuit 52 includes a first resistor 68, a second resistor 70, a third resistor 72, and suitable differential amplifier 74 having a first input (−) 76, a second input (+) 78 and an output 80. The first amplifier input 76 is electrically interconnected through the first resistor 68 with the anode of the first diode 8. The second amplifier input 78 is electrically interconnected through the second resistor 70 with the anode of the second diode 10. The third resistor 72 is electrically connected between the amplifier output 80 and the first amplifier input (−) 76. A fourth resistor 82, which is electrically between a node 84 of the circuit 54 and the second amplifier input (+) 78, matches the impedance of the two amplifier inputs 76,78 and biases the voltage of the amplifier output 80 with respect to the voltage +E/2 VDC.

The value of K (as shown in FIG. 5) is equal to the resistance of resistor 72 divided by the resistance of resistor 68, assuming that resistors 72 and 82 have the same resistance, and assuming that resistors 68 and 70 have the same resistance. Hence, the resistors 68,70,72,82 are selected to provide a suitable gain (K) for the differential amplifier 74.

If the difference in sensed voltages of the diodes 8,10 (i.e., V2−V1) is amplified by the differential amplifier 74 with, for example, a gain of about K=10, and there is, for example, a 30° C. temperature difference between the diodes 8,10, which have a temperature coefficient of about 2 mV/° C., then the voltage (i.e., K*(V2−V1)+E/2) of the amplifier output 80 is about 600 mV+E/2 VDC. In the exemplary circuit 52 of FIG. 5, the amplifier inputs 76,78 and output 80 are referenced to the voltage +E/2 as supplied from the power supply 56. Hence, in this example, the voltage of the amplifier output 80 is about +600 mV above the voltage +E/2 VDC.

The circuit 54 includes a window comparator 86 having a first reference voltage 88, a second reference voltage 90, an input 92 inputting a difference signal 94 from the amplifier output 80, and an output 96 having the glowing contact indication signal 50. This indication signal 50 is active when the difference signal 94 is greater than the first reference voltage 88 or is less than the second reference voltage 90. The input 92 of the circuit 54 is electrically connected with the output 80 of the differential amplifier 74. The circuit 54 also includes four resistors 98,100,102,104, which are electrically connected in series between the first power supply output 58 (+E VDC) and the common reference output 62 to define the first reference voltage (e.g., +E/2+D) 88 at a node 106 between the resistors 98,100, the node 84 (e.g., having the voltage +E/2) between the resistors 100,102, and the second reference voltage (e.g., +E/2−D) 90 at a node 108 between the resistors 102,104. The first and second reference voltages 88,90 define a voltage window (e.g., +E/2±D) with the first reference voltage (e.g., +E/2+D) 88 being above the nominal voltage (e.g., +E/2) of the differential amplifier 74 and the second reference voltage (e.g., +E/2−D) 90 being below the nominal voltage (e.g., +E/2) of the differential amplifier 74. The difference (D) between the first reference voltage (e.g., +E/2+D) 88 and the nominal voltage (e.g., +E/2) of the differential amplifier 74 is about equal to a difference (D) between the nominal voltage (e.g., +E/2) of the differential amplifier 74 and the second reference voltage (e.g., +E/2−D) 90. For example, if the difference (D) is set to about 600 mV, then the glowing contact differential temperature threshold is about 30° C. (i.e., 30° C.×2 mV/° C.×10=600 mV).

The window comparator 86 includes a first comparator 110 having a first input (−) 112, a second input (+) 114, and an output 116; a second comparator. 118 having a first input (−) 120, a second input (+) 122, and an output 124, a first diode 126; and a second diode 128. The first input 112 of the first comparator 110 is electrically connected to the node 106 to input the first reference voltage (e.g., +E/2+D) 88. The second input (+) 122 of the second comparator 118 is electrically connected to the node 108 to input the second reference voltage (e.g., +E/2−D) 90. The second input 114 of the first comparator 110 and the first input 120 of the second comparator 118 are electrically connected to the input 92 to input the difference signal 94. The diodes 126,128 are electrically connected between the outputs 116,124 of the comparators 110,118, respectively, and the output 96 of the window comparator 86.

The input 92 of the exemplary window comparator 86 receives the voltage (i.e., K*(V2−V1)+E/2) of the amplifier output 80. That window comparator 86 employs a suitable voltage window of +/−D volts, as referenced to the voltage +E/2 (e.g., +E/2±D). For example, if D is set equal to 600 mV, and if the amplifier output 80 is slightly above D+E/2 volts, then this causes the output 116 of the first comparator 110 to go high. Current then flows through the associated diode 126 through a resistor 130 to the gate 132 of SCR 134, thereby turning the SCR 134 on, and energizing an indicator, such as a light emitting diode (LED) 136 through a resistor 138, from the line circuit 28. The SCR 134, LED 136 and resistor 138 form a display circuit 140, which may be part of or associated with the circuit 54.

Otherwise, should, for example, the neutral terminal 22 of FIG. 4 be glowing (not shown), and if the neutral connection (e.g., male plug) 37 of the neutral circuit 29 of FIG. 5 is electrically connected to and, thus, in thermal communication with, the female neutral terminal 16 of one of the three-conductor outlets 12 of FIG. 4, then that glowing contact (not shown) of FIG. 4 raises the temperature of the neutral circuit 6 of FIG. 4 and, also, the neutral circuit 29 of FIG. 5. Hence, the second diode 10 will be relatively hotter than the first diode 8. If there is a sufficient difference between the temperature of the circuits 29,28, then the amplifier output 80 is slightly below E/2−D volts, which causes the output 124 of the second comparator 118 to go high. Current then flows through the associated diode 128 through the resistor 130 to the gate 132 of SCR 134. In the same manner as discussed above, this energizes the indicator 136.

Hence, the circuit 54 includes the window comparator 86, which outputs the indication signal 50 when the difference signal 94 is greater than the first predetermined reference voltage 88 or when the difference signal 94 is less than the second predetermined reference voltage 90.

Figure 6:
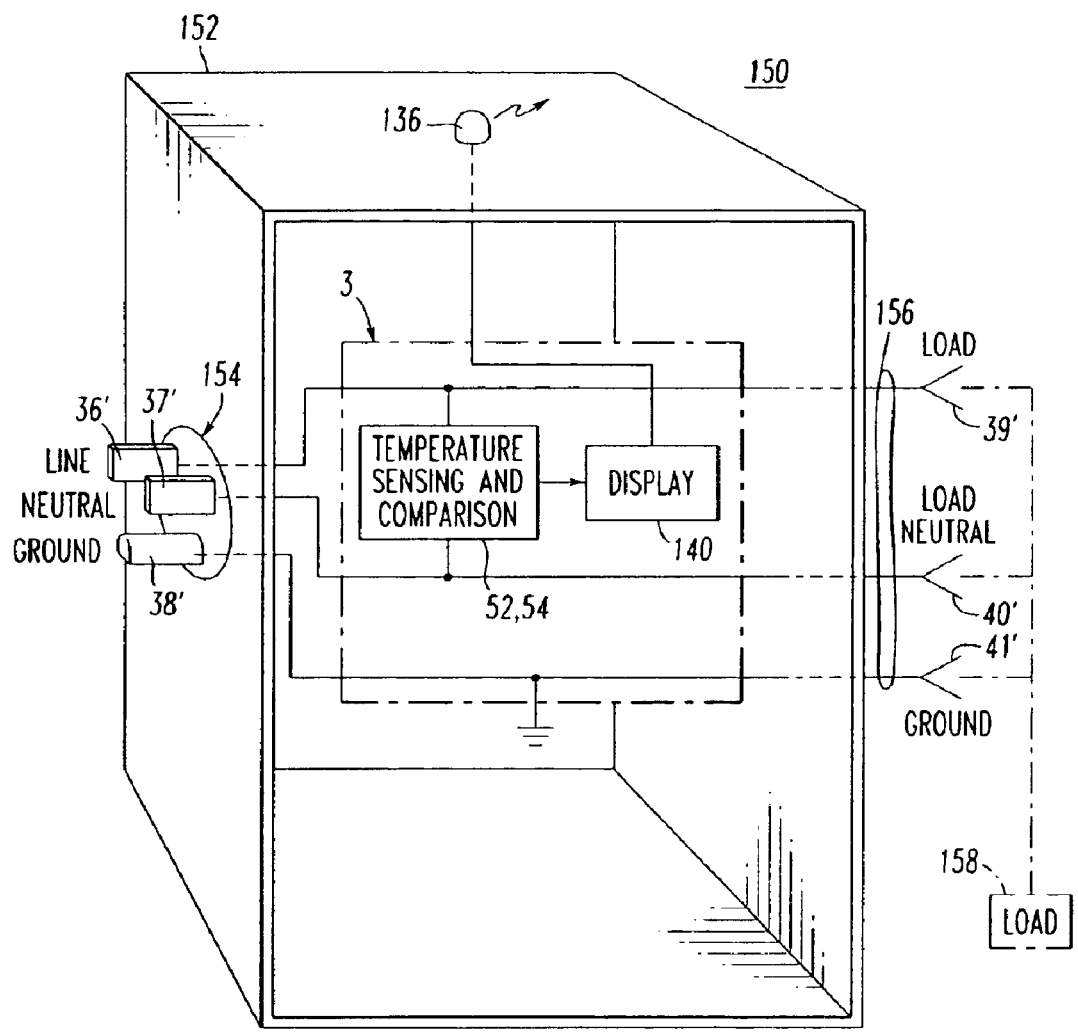
FIG. 6 is an isometric view of a tester device in accordance with another embodiment of the invention.

Referring to FIG. 6, a test device 150 is employed to test the line circuit 4 and the neutral circuit 6 of an electrical distribution device, such as the receptacle 2 of FIG. 4. The test device 150 includes a housing 152 for the circuits 52,54,140 of FIG. 5. The housing 152 preferably includes a conventional three-terminal plug 154 disposed therefrom. The three-terminal plug 154 includes a first line plug 36', a second neutral plug 37' and a third ground plug 38', which is electrically connected to the housing 152. It will be appreciated that the three-terminal plug 154 may electrically engage and thermally communicate with one of the three-conductor outlets 12 of FIG. 4.

The housing 152 preferably further includes a conventional three-terminal socket 156 disposed therefrom. The three-terminal socket 156 includes a first line socket 39' electrically connected to the first line plug 36', a second neutral socket 40' electrically connected to the second neutral plug 37', and a third ground socket 41' electrically connected to the third ground plug 38'. It will be appreciated that the three-terminal socket 156 may readily be electrically connected to a suitable load, such as a heater 158. The LED 136 is advantageously mounted on the housing 152 for external display.

Although the heater 158 is shown, if the electrical distribution device, such as the receptacle 2, is daisy chained to another electrical distribution device (e.g., another receptacle; a wiring device) with a load, then the heater may not be needed. Otherwise, the heater 158 is advantageously employed to pass suitable current, such that if there is a high resistance connection in one of the line or neutral current paths, such as would result in the glowing contact 24 of FIG. 4, then the resulting line-neutral temperature differential will be detected and indicated by the test device 150.

Although an external heater 158 is shown, it will be appreciated that a heater may be suitably integrated with or located within the test device 150. For example, a switch (not shown) may be employed to selectively electrically connect the heater to the line and neutral circuits 28,29. As another alternative, a test device (not shown) and corresponding heater (not shown) may be employed with two or more phases of a three-phase power circuit.

The present invention provides a solution to the glowing contact problem. Although exemplary values of the diode temperature coefficient (e.g., without limitation, −2 mV/° C.), 30° C. differential temperature threshold, K (e.g., without limitation, 10) and D (e.g., without limitation, 600 mV) are disclosed, it will be appreciated that a wide range of such values may be employed based upon the desired glowing contact temperature difference sensitivity.

An important feature of the exemplary design is the fact that it is responsive to temperature differences, not absolute temperature. This is important in applications such as, for example, relatively hot, outside receptacles, which are heated by the sun.

Although analog circuits 48,52,54,140 are disclosed, it will be appreciated that one or more functionally equivalent digital circuits may be employed.

Although an LED indicator 136 is disclosed, any suitable visual, audible, vibratory and/or electrical or other display may be employed to indicate, annunciate or otherwise make known the presence of the glowing contact signal 50. For example, such signal may be stored, printed on hard copy, be computer modified, be combined with other data, or be transmitted for display elsewhere. All such processing shall be deemed to fall within the terms "display" or "displaying" as employed herein.

The differential temperature measurement and indication disclosed herein is useful, since it provides an excellent indicator of the presence of a potentially hazardous high resistance or glowing contact connection in either the line or neutral current path of an electrical distribution device. Such a high resistance connection is "behind the wall" and, thus, is hidden. However, the disclosed test device 150 is "hand-held" and/or "in the room" and can detect and indicate the hidden problem.

The exemplary tester 3 and test device 150 may be advantageously employed with electrical distribution devices, such as receptacles, switches, light fixtures and other wiring devices, having a high resistance series electrical connection, such as would result in a glowing contact.

Although the test device 150 employs male plug connections 36',37',38' to electrically engage the female sockets 14,16,18 of the receptacle 2, the female socket connections 39',40',41' may be employed to electrically engage male plug connections (not shown) of another electrical distribution device, such as a power cord (not shown) having a three-terminal male plug.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A test apparatus for a first power circuit and a second power circuit of an electrical distribution device, said first power circuit having a first temperature, said second power circuit having a second temperature, said test apparatus comprising:
    a first circuit adapted to thermally respond to the first temperature of the first power circuit of said electrical distribution device;
    a second circuit adapted to thermally respond to the second temperature of the second power circuit of said electrical distribution device;
    a first temperature sensor proximate said first circuit and outputting a first signal representative of the first temperature of said first power circuit;
    a second temperature sensor proximate said second circuit and outputting a second signal representative of the second temperature of said second power circuit;
    a third circuit determining a difference between the first and second signals; and
    a fourth circuit outputting an indication signal as a function of said difference.

2. The test apparatus as recited in claim 1 wherein said first circuit includes a line connection, which is adapted to electrically engage and thermally communicate with the first power circuit of said electrical distribution device.

3. The test apparatus as recited in claim 2 wherein said line connection is a male plug which is adapted to electrically engage a female socket.

4. The test apparatus as recited in claim 1 wherein said second circuit includes a neutral connection, which is adapted to electrically engage and thermally communicate with the second power circuit of said electrical distribution device.

5. The test apparatus as recited in claim 4 wherein said neutral connection is a male plug which is adapted to electrically engage a female socket.

6. The test apparatus as recited in claim 1 wherein said fourth circuit includes a display.

7. The test apparatus as recited in claim 6 wherein said display is a light emitting diode.

8. The test apparatus as recited in claim 1 wherein said fourth circuit comprises a comparator, which outputs said indication signal when the difference exceeds a predetermined value.

9. The test apparatus as recited in claim 1 wherein said first circuit is a line circuit including a male plug connection; and wherein said first temperature sensor is a diode disposed proximate the male plug connection.

10. The test apparatus as recited in claim 1 wherein said second circuit is a neutral circuit including a male plug connection; and wherein said second temperature sensor is a diode disposed proximate the male plug connection.

11. The test apparatus as recited in claim 1 wherein said third circuit comprises a first resistor, a second resistor, a third resistor, a fourth resistor, and a differential amplifier having a first input, a second input and an output, said first resistor being electrically connected between said first temperature sensor and the first input of said differential amplifier, said second resistor being electrically connected between said second temperature sensor and the second input of said differential amplifier, said third resistor being electrically connected between the output of said differential amplifier and one of the first and second inputs of said differential amplifier; wherein said first and second temperature sensors have a common reference; and wherein said fourth resistor is electrically connected between the other of the first and second inputs of said differential amplifier and said common reference.

12. The test apparatus as recited in claim 1 wherein said fourth circuit comprises a window comparator having a first reference, a second reference, an input inputting said difference, and an output having said indication signal, said indication signal being active when said difference is greater than the first reference or less than the second reference.

13. The test apparatus as recited in claim 12 wherein said window comparator comprises a first diode; a second diode; a first comparator having a first input, a second input, and an output; and a second comparator having a first input, a second input, and an output, the first input of said first comparator inputting said first reference, the second input of said second comparator inputting said second reference, the second input of said first comparator and the first input of said second comparator inputting said difference, said first diode being electrically connected between the output of said first comparator and the output of said window comparator, said second diode being electrically connected between the output of said second comparator and the output of said window comparator.

14. The test apparatus as recited in claim 1 wherein said third circuit comprises a differential amplifier having a first input electrically interconnected with said first sensor, and a second input electrically interconnected with said second sensor.

15. The test apparatus as recited in claim 14 wherein said differential amplifier has a gain of about 10.

16. The test apparatus as recited in claim 14 wherein said first and second temperature sensors are two diodes having a forward voltage with a temperature coefficient of about 2 mV/° C.

17. The test apparatus as recited in claim 14 wherein said differential amplifier comprises an output having a nominal voltage; and wherein said fourth circuit comprises a window comparator having an input electrically connected with the output of said differential amplifier, a first reference voltage and a second reference voltage, said first and second reference voltages defining a voltage window with the first reference voltage being above the nominal voltage of said differential amplifier and the second reference voltage being below the nominal voltage of said differential amplifier.

18. The test apparatus as recited in claim 17 wherein a first difference between the first reference voltage and the nominal voltage of said differential amplifier is about equal to a second difference between the nominal voltage of said differential amplifier and the second reference voltage.

19. The test apparatus as recited in claim 18 wherein said first and second differences are about 600 mV.

20. A test device for a first power circuit and a second power circuit of an electrical distribution device, said first power circuit having a first temperature, said second power circuit having a second temperature, said test device comprising:
   a housing;
   a first circuit substantially within said housing, said first circuit including a first electrical connection disposed from said housing and adapted to electrically engage and thermally communicate with the first power circuit of said electrical distribution device;
   a second circuit substantially within said housing, said second circuit including a second electrical connection disposed from said housing and adapted to electrically engage and thermally communicate with the second power circuit of said electrical distribution device;
   a first temperature sensor proximate said first circuit and said first electrical connection, said first temperature sensor outputting a first signal representative of the first temperature of said first power circuit;
   a second temperature sensor proximate said second circuit and said second electrical connection, said second temperature sensor outputting a second signal representative of the second temperature of said second power circuit;
   a third circuit determining a difference between the first and second signals; and
   a fourth circuit displaying an indication signal as a function of said difference.

21. The test device as recited in claim 20 wherein said electrical distribution device is a receptacle including a line socket for said first power circuit and a neutral socket for said second power circuit; wherein said first electrical connection is a first line plug adapted to electrically engage and thermally communicate with said line socket; and wherein said second electrical connection is a second neutral plug adapted to electrically engage and thermally communicate with said neutral socket.

22. The test device as recited in claim 21 wherein said housing includes a three-terminal plug disposed therefrom, said three-terminal plug including said first line plug, said second neutral plug and a third ground plug, which is electrically connected to said housing.

23. The test device as recited in claim 22 wherein said housing further includes a three-terminal socket disposed therefrom, said three-terminal socket including a first line socket electrically connected to said first line plug, a second neutral socket electrically connected to said second neutral plug, and a third ground socket electrically connected to said third ground plug.

24. The test device as recited in claim 23 wherein said three-terminal socket is adapted to electrically connect to a heater.

25. The test device as recited in claim 20 wherein said electrical distribution device is a wiring device.

* * * * *